United States Patent [19]
Yagi et al.

[11] 3,967,595
[45] July 6, 1976

[54] SIDE VALVE INTERNAL COMBUSTION ENGINE

[75] Inventors: Shizuo Yagi, Asaka; Toshio Shioya, Urawa; Yukio Tada, Kawagoe, all of Japan

[73] Assignee: Honda Giken Kogyo Kabushiki Kaisha, Tokyo, Japan

[22] Filed: Apr. 15, 1974

[21] Appl. No.: 460,800

[52] U.S. Cl............................ 123/32 SP; 123/75 B
[51] Int. Cl.² .................... F02D 19/10; F02D 19/16
[58] Field of Search........... 123/32 ST, 32 SP, 75 B, 123/191 S, 191 SP

[56] References Cited
UNITED STATES PATENTS
| | | | |
|---|---|---|---|
| 1,415,374 | 5/1922 | Lovejoy | 123/191 S |
| 3,844,259 | 10/1974 | Asaka | 123/32 SP |

*Primary Examiner*—Charles J. Myhre
*Assistant Examiner*—Ronald B. Cox
*Attorney, Agent, or Firm*—Lyon & Lyon

[57] ABSTRACT

An internal combustion piston engine employs a stratified charge. Separate carburetor throats are provided for directing rich air-fuel mixture to a prechamber and lean air-fuel mixture to a main combustion chamber. The rich mixture is heated by the engine exhaust gases and then delivered to the prechamber. A spark plug ignites the rich mixture and causes a torch flame to project laterally through a torch slot in the prechamber wall into the main combustion chamber to ignite the lean mixture contained therein. In this way, the amount of unwanted emissions such as carbon monoxide may be reduced in the exhaust gases discharged into the atmosphere.

12 Claims, 8 Drawing Figures

SIDE VALVE INTERNAL COMBUSTION ENGINE

The present invention is directed to a side valve, internal combustion piston engine. More specifically, the present invention is directed to a stratified charge engine of this type to reduce the amount of unwanted emissions present in the exhaust gases.

Side valve, reciprocating, internal combustion engines have been employed as an inexpensive, reliable source of power for small jobs such as powering generators, compressors and the like. In spite of the advantages associated with the inexpensive and relatively reliable construction of such units, the inefficiency generally characteristic of internal combustion engines and specifically characteristic of side valve internal combustion engines leads to a relatively high level of unwanted emissions in such units. The convenience and portability of such units commonly leads to their use in relatively confined locations. The high level of unwanted exhaust emissions can lead under such conditions to an unpleasant if not dangerous situation. The emission of carbon monoxide from a running engine can lead to asphyxiation of anyone remaining in confined quarters with such an engine.

The reduction of unwanted emissions in prior art engines has been achieved in a variety of ways including direct exhaust processing such as with catalytic converters. Control of the combustion process within such engines has also been successful in achieving reduced emission of unwanted exhaust constituents. Stratified charge engines have been employed as a means for controlling the combustion process. Such stratified charge engines have been developed around basic overhead valve designs wherein a prechamber is disposed in the engine head. A prechamber inlet valve and its associated intake passage are also generally established in the engine head for supplying the prechamber with a rich air-fuel mixture. It has also been found of benefit in some applications to preheat the rich air-fuel mixture in order that the mixture will be totally vaporized upon ignition.

The present invention provides a side valve, reciprocating, internal combustion engine with means whereby it may operate as a stratified charge engine. At the same time, the advantageous features associated with the side valve engine are not compromised. Specifically, the present invention through the control of the combustion process substantially reduces the amount of unwanted emissions in the exhaust. Of primary importance is the reduction in the amount of carbon monoxide present in the exhaust gases of side valve engines employing the present invention. This, of course, will help reduce the health hazard associated with the use of such engines in semiconfined areas. Further, the present invention has been found to increase the efficiency of such side valve engines with a noticeable increase in fuel economy.

Side valve engines have been considered relatively inexpensive to manufacture and relatively reliable. These advantageous features are derived from the convenient location of the main inlet and exhaust valves. Specifically, these valves are positioned within the engine block and may be operated directly from a conventional cam shaft rather than indirectly through rods and rocker arms as required in most overhead valve engines. The present system incorporates a prechamber inlet valve which is also advantageously positioned within the block and driven directly from the cam shaft. Thus, the same advantageous features of the standard side valve engine are obtained with the prechamber and prechamber intake system.

The present invention also incorporates specific configurations which add to the overall efficiency of the system. The spark plug is so positioned as to inhibit the fouling of the electrodes. The intake manifolds are situated so that they provide increased efficiency and also conserve space. The exhaust manifold is positioned subjacent the intake manifolds to provide heating of the intake mixtures. A heat shield prevents overheating of the carburetors otherwise resulting in vapor lock.

In order that the overall system will operate effectively, a torch nozzle or slot is provided in the wall of the prechamber to direct the ignited rich air-fuel mixture laterally into the main combustion chamber for proper combustion of both the rich air-fuel mixture and the lean air-fuel mixture. The torch nozzle enables the prechamber to be placed adjacent the main intake and exhaust valves allowing the prechamber inlet valve to be advantageously located in the block. At the same time, the flame from the torch nozzle is directed toward the region of the main combustion chamber swept by the piston.

Thus, it is an object of the present invention to provide an improved side valve, reciprocating, internal combustion engine through the employment of a stratified charge combustion process.

It is another object of the present invention to provide a means for reducing unwanted emissions from the exhaust of a side valve, reciprocating, internal combustion engine.

It is yet another object of the present invention to provide a side valve, reciprocating, internal combustion engine wherein a prechamber is provided proximate to the main intake and exhaust system through the embodiment of a torch nozzle for directing combusting rich mixture laterally into the main combustion chamber.

A further object of the present invention is to provide a conversion for a side valve, reciprocating, internal combustion engine wherein the prechamber inlet valve may be disposed adjacent the main intake and exhaust valves.

Another object of the present invention is to provide a stratified charge combustion process for a side valve, reciprocating, internal combustion engine wherein the ignition system is relatively free from fouling.

A further object of the present invention is to provide a stratified charge combustion process in a side valve, reciprocating, internal combustion engine wherein the intake mixtures may be preconditioned by the heat from the exhaust gases.

Thus, a more efficient, cleaner burning side valve, reciprocating, internal combustion engine is provided through the employment of a conversion for operating the engine with a stratifed charge combustion process. Other and more detailed objects and advantages will appear hereinafter.

Figure 1:
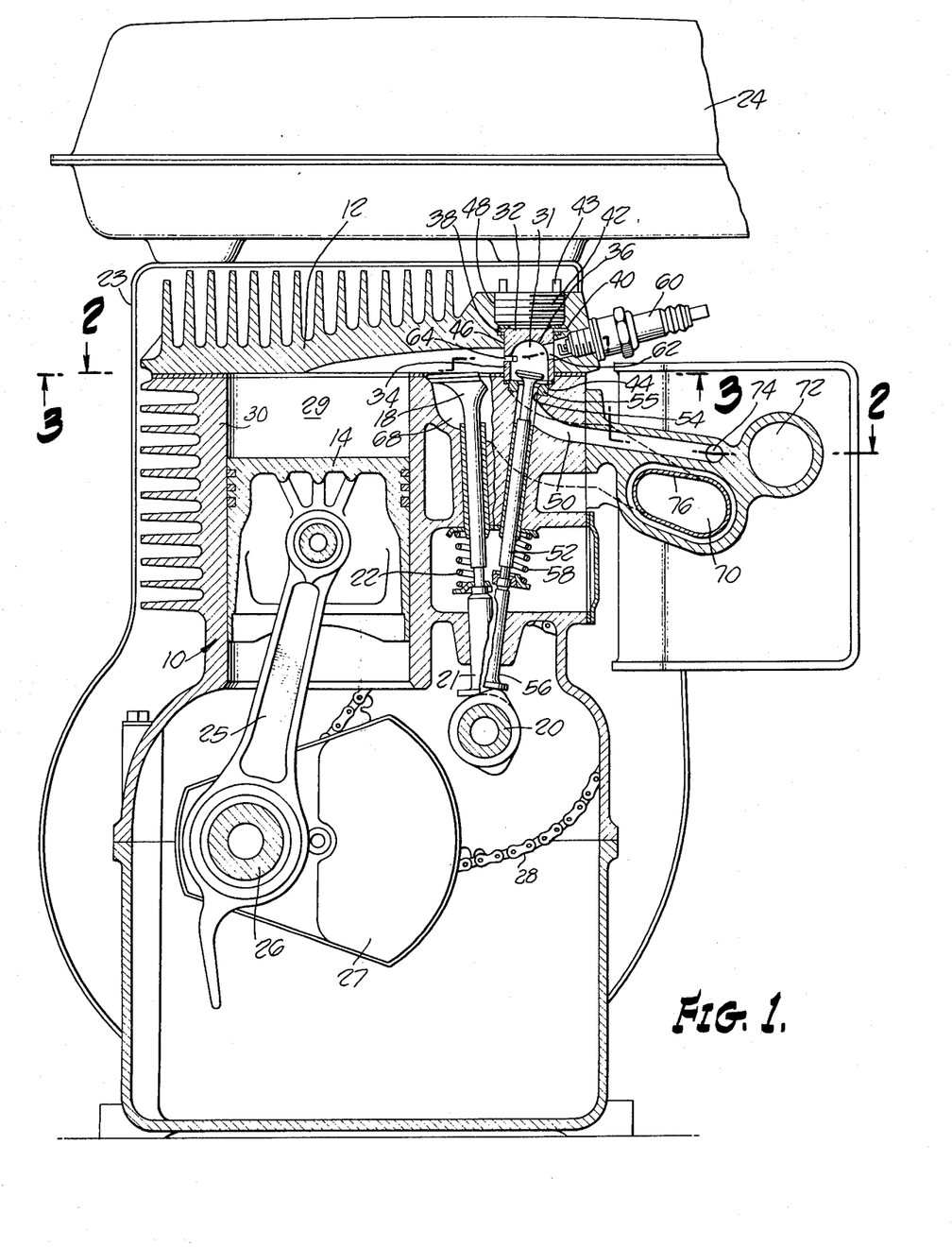
FIG. 1 is an elevation view of a preferred embodiment of the present invention taken in section along lines 1—1 of FIG. 2.
Figures 2, 3:
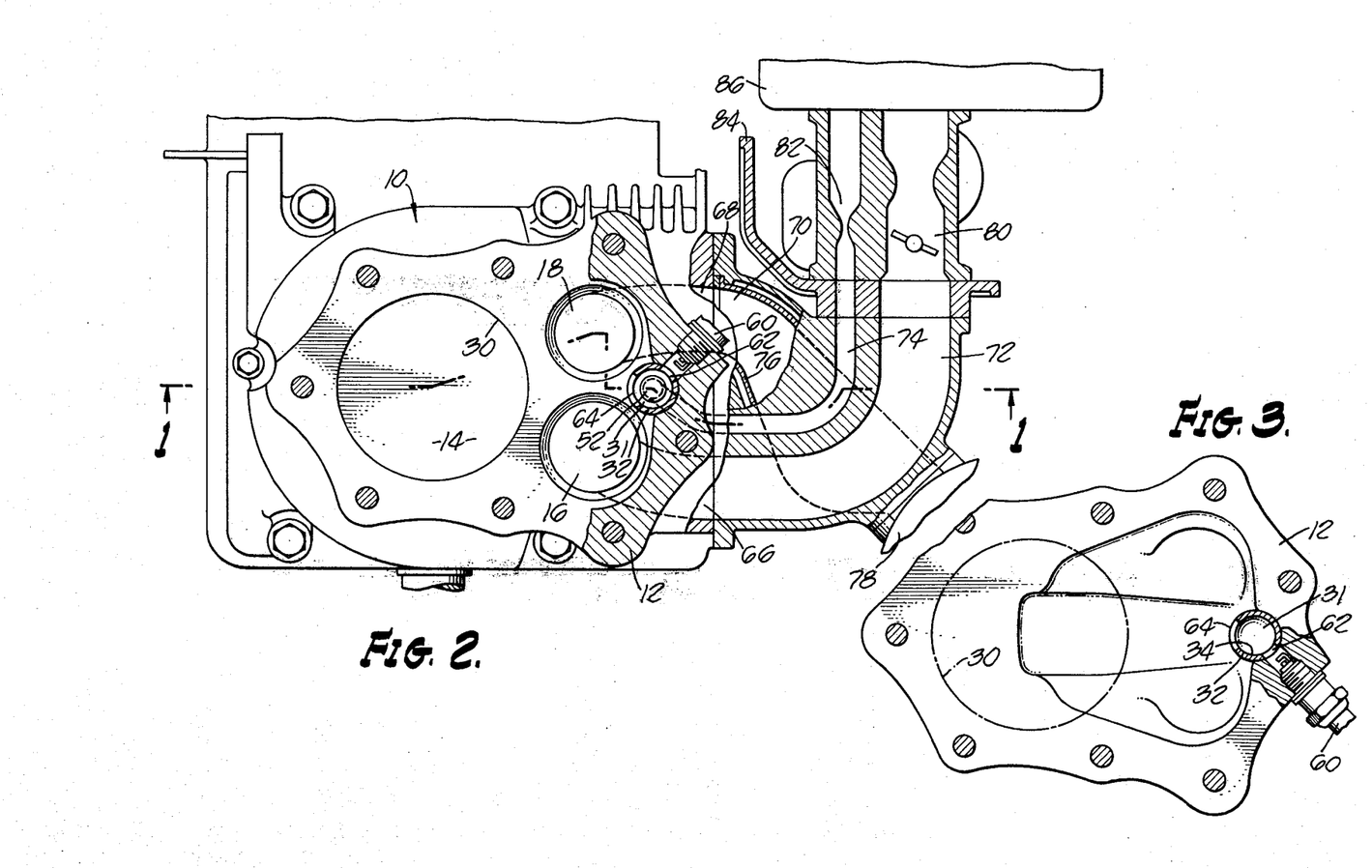
FIG. 2 is a cross sectional plan view of the present invention taken along lines 2—2 of FIG. 1.
FIG. 3 is a plan view of the inside surface of the engine head as taken along lines 3—3 of FIG. 1.

Referring to the drawings, specifically the preferred embodiment of FIGS. 1–3, a side valve, reciprocating, internal combustion engine is disclosed including a block 10, a head 12 and a piston 14. In the present embodiment, only a single piston engine is disclosed. However, the principles and advantages of the present invention are equally applicable to a multi-piston engine. The engine includes a main intake valve 16 and a main exhaust valve 18 located adjacent the piston 14 in the block. The main intake valve 16 and the main exhaust valve 18 are driven directly from a cam shaft 20 through conventional cam followers 21. Conventional valve springs 22 are also provided. The engine shown in the present embodiment is air cooled and includes a cover 23 and has a gas tank 24 positioned above the engine head 12. Conventional connecting rod 15, crank shaft 26, counterweight 27 and valve timing system 28 are employed in the present embodiment.

The main combustion chamber 29 is defined by a plurality of surfaces including a cylinder 30 provided within the block 10, the upper surface of the piston 14, the inner surface of the head 12 and the upper surface of the block 10 where the main combustion chamber extends over the main intake valve 16 and main exhaust valve 18.

A prechamber 31 is provided adjacent the main combustion chamber 29 proximate to the location of the main intake and exhaust valves 16 and 18. The prechamber 31 is defined by a thin wall liner or insert 32 having a central cavity having an open end 34. The body of the insert 32 is substantially cylindrical. The central cavity 34 is closed at the end remote from the open end by a hemispherical wall 36. A placement flange 38 is provided about the upper rim of the insert 32. A key 40 cooperates with a notch in the placement flange 38 to control the orientation of the insert 32 about its symmetrical center line. The insert 32 may be of a stainless steel material able to resist the effects of high temperatures. A clamping nut 42 is threaded into the engine head 12 above the insert 32 to retain the insert within the engine. Lugs 43 extending from the upper surface of the clamping nut 42 provide wrench surfaces for tightly securing the clamping nut 42 in the engine head 12.

Thus, the insert 32 extends from the engine head 12 down into a shallow circular bore 44 in the block 10. The shallow circular bore 44 in the block 10 removes the substantially open end of the central cavity 34 of the prechamber 31. The insert 32 and clamping nut 42 are positioned through the head 12 where a spark plug may have been positioned in a conventional side valve engine. A minor bore 46 provides for the insertion of the main body of the insert 32. However, the placement flange 38 prevents the insert from completely passing through the minor bore 46. A larger bore 48 is provided above the minor bore 46 to receive the placement flange 38. A key way is established in the side of the larger bore 48 for receipt of key 40. The larger bore 48 is threaded to accommodate the clamping nut 42.

Means for providing a rich air-fuel mixture to the prechamber 31 are established through the block 10. A prechamber inlet passageway 50 is provided through the block 10 to the substantially open end of the central cavity 34. A prechamber inlet valve 52 is positioned adjacent the main intake and exhaust valves 16 and 18 and is designed to control the prechamber inlet port 54 associated with the prechamber inlet passageway 50. The prechamber inlet port 54, the prechamber inlet valve 52, and a valve seat insert 55 are located centrally within the shallow circular bore 44 established in the block 10 at the substantially open end of the central cavity 34. The prechamber inlet valve 52 is directly driven from the cam shaft 20 through a cam follower 56. A valve spring 58 is also provided. In this way, the advantageous simplicity and reliability of the side valve, reciprocating, internal combustion engine is preserved.

Means are provided for the ignition of the mixture in the prechamber 31. A conventional spark plug 60 may be employed. A hole 62 is provided through the wall of the prechamber 31 to effect communication between the spark plug 60 and the prechamber 31. It has been found convenient to locate the spark plub 60 directly through the concentric with the clamping nut 42 and the insert 32. This is considered to be an acceptable location for the spark plug 60. However, the nature of the mixture present within the prechamber 31 tends to foul the electrodes of the spark plug 60 and consequently, this convenient, centralized position does not provide the most preferred location. Instead, the spark plug 60 has been found to better resist fouling when positioned in misalignment with the axis of the prechamber 31. Specifically, the spark plug 60 and hole 62 is not positioned directly opposite the intake port 54. Consequently, the incoming rich mixture will not tend to deposit as readily on the electrodes of the spark plug 60. Further, the spark plug 60 and hole 62 are not directly in line and opposite from the torch slot described below. As can be seen in FIG. 3, the spark plug 60 is offset from the centerline of the head 12. During the compression stroke, rich mixture which had been drawn into the main combustion chamber before ignition is forced back into the prechamber 31. Misalignment of the spark plug 60 and hole 62 relative to the path of the returning rich mixture through the torch slot will operate to reduce the propensity for the spark plug to foul. At the same time, the spark plug is sufficiently proximate to the prechamber 31 in order that the rich mixture contained within the prechamber 31 will be easily ignited by the spark generated.

A torch slot 64 is cut through the wall of the prechamber 31 for directing combusting rich mixture laterally into the main combustion chamber 29. The torch slot 64 is located substantially centrally on the side of the prechamber 30 directly adjacent the main combustion chamber 29. In this way, a substantial portion of the combusting rich mixture will be directed toward the center of the main combustion chamber 29 adjacent the top surface of the piston 14. As the rich mixture ignited within prechamber 31 is directed toward the center of the main combustion chamber 29, the effect of the location of the prechamber 31 at a distance from the upper surface of the piston 14 is minimized. Further, as the pressurized combusting gases are driven through the torch slot 64, they tend to diverge and fill the main combustion chamber 29 to mix with the lean air-fuel mixture contained therein. In this way, a more efficient combustion of the overall fuel and air mixture is provided. Because the air-fuel mixture is ignited when the piston is near the upper end of its stroke, the main combustion chamber 29 is a relatively wide and thin volume during the directing of the combusting rich mixture into the main chamber 29. Consequently, the torch nozzle is formed into this horizontal torch slot 64. The slot 64 will direct the combusting mixture laterally into the chamber 29 and will at the same time provide a horizontal diverging effect to insure further mixing across the relatively wide and thin area. The vertical dimension of the slot 64 is kept small to achieve a horizontally diverging torch and still maintain substantial lateral movement of the combusting rich mixture.

Associated with the intake valve 16 is a main intake passageway 66. Associated with the main exhaust valve 18 is a main exhaust passageway 68. The intake passageway 66 leads from and the exhaust 68 leads to a combined manifold system which further includes provision for the prechamber inlet passageway 50. The combined manifold means includes an exhaust manifold 70, a main intake manifold 72 and a prechamber intake manifold 74. The main intake manifold 72 and the prechamber intake manifold 74 run substantially adjacent one another to the block 10. A right angle bend is provided in each of the intake manifolds 72 and 74. This right angle bend conserves space by positioning the carburetion system adjacent the engine and also operates to separate unvaporized fuel.

The main exhaust manifold 70 extends across and subjacent the main intake manifold 72 and the auxiliary intake manifold 74. The several manifolds 70, 72 and 74 may be provided in the same casting or in thermally associated separate castings in order that heat may be transferred from the exhaust manifold 70 to the intake manifold 72 and 74. Advantageously, the exhaust manifold 70 passes under the intake manifold 72 and 74 at the right angle bend in each of the two intake manifolds. Consequently, the greatest effect of the heat transferred from the exhaust manifold 70 will be realized at the right angle bends in the intake manifolds where fuel which is not properly vaporized tends to separate and adhere to the walls of the intake manifolds. The heating of these intake manifolds in this area causes this unvaporized fuel to vaporize and continue into the engine.

A liner 76 is provided inside of the exhaust manifold 70 through which the exhaust gases are to pass. This liner 76 is conveniently of stainless steel to resist the high temperatures of the exhaust gases. The liner 76 operates to retain a major portion of the exhaust heat within the exhaust manifold 70. In this way, the combustion process may continue, converting hydrocarbons and carbon monoxide into clean emissions. In order that the combustion process may continue, the overall mixture of air and fuel provided to the engine should be in the stochiometric ratio or leaner than the stochiometric ratio. In this way, oxygen will remain for the continued combustion of the hydrocarbons and the carbon monoxide. Thus, the liner 76 tends to retain heat within the exhaust manifold 70 rather than allow for its transfer to the intake manifold 72 and 74. However, sufficient heat is transferred for effective preconditioning of the intake mixtures. A muffler 78 may be conveniently provided at the end of the exhaust manifold 70.

Located in communication with the main intake manifold 72 is a main carburetor assembly 80. A lean air-fuel mixture is provided by the main carburetor assembly 80. Located in communication with the prechamber intake manifold 74 is a prechamber carburetor assembly 82 adjusted to provide a rich air-fuel mixture to the prechamber 31. A non-metallic heat shield 84 extends between the carburetors and the intake manifolds and also between the carburetors and the main body of the engine to prevent overheating of the carburetors which might otherwise result in vapor lock. An air cleaner 86 may be conveniently provided ahead of the carburetor assemblies 80 and 82.

The three openings in the prechamber 31 comprise the torch nozzle 64, the open end 34 of the liner 32 and the hole 62.

The overall operation of the stratified charge, side valve internal combustion engine includes the charging of the main combustion chamber 29 with a lean air-fuel mixture through the intake valve 16 during the suction stroke of the piston 14. Simultaneously, a rich air-fuel mixture is drawn into the prechamber 31 through the prechamber inlet port 54, and into the upper portion of the main chamber 29 through the torch nozzle or slot 64. The resulting charges are then compressed during an upstroke of the piston 14 and the spark plug 60 ignites the mixture of the prechamber 31. The combusting rich air-fuel mixture is then directed through the torch nozzle 64 into the main combustion chamber 29. The rich air-fuel mixture from the prechamber 31 and the lean air-fuel mixture in the main combustion chamber 29 are then combusted together and exhausted around the valve 18. The overall air and fuel mixture is advantageously leaner than the stoichiometric ratio in order that the exhausted gases will continue to burn within the exhaust manifold 70. In this way, more complete combustion will occur. As the exhaust gases pass through the exhaust manifold 70, the intake mixtures are preconditioned by means of heat transfer between the exhaust manifold 70 and the two intake manifolds 72 and 74.

Figure 4:
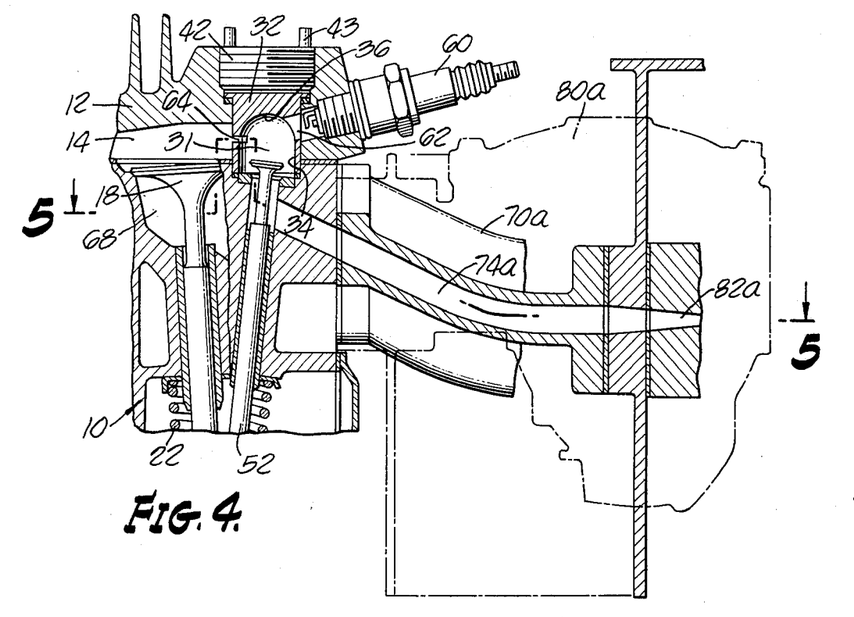
FIG. 4 is a sectional detail of a modification showing an alternate prechamber arrangement, taken along lines 4—4 of FIG. 5.
Figure 5:
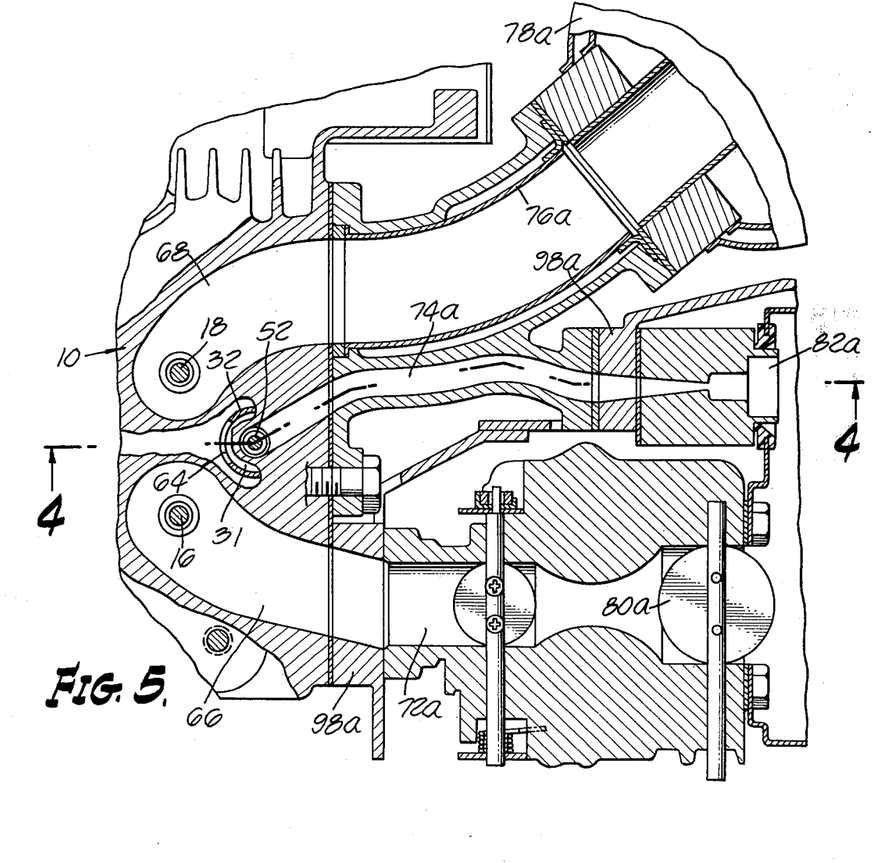
FIG. 5 is a sectional detail taken along lines 5—5 of FIG. 4.

Turning to the modification shown in FIGS. 4 and 5, the intake manifold 74a is positioned adjacent the exhaust manifold 70a. In this way, heat may be transferred from the exhaust manifold 70a to the auxiliary intake manifold 74a for preconditioning of the rich air-fuel mixture. The lean air-fuel mixture is not subjected to this preconditioning as the main intake manifold 72a is at a distance from the exhaust manifold 70a. Again, a liner 76a is provided on the interior of the exhaust manifold 70a in order that substantial exhaust heat will remain within the exhaust gases so that combustion will continue. To prevent vapor lock and other high temperature effects in the carburetion systems 80a and 82a, a heat shield system is employed. A spacer 96a of low thermal-conductivity is positioned between the block 10a and the carburetor 80a. A similar spacer 98a is positioned between the prechamber intake manifold 74a and the carburetor 82a. Both spacers 96a and 98a include sheet-like extensions to further shield the carburetors from the heat of the engine.

In this modified form of the invention, the engine block 10 and engine head 12, together with the parts which form the prechamber 31, torch nozzle 64, main chamber 14, as well as valves 16, 18 and 52, are substantially the same as previously described, except for minor modifications to accommodate the modified intake and exhaust systems.

Figure 6:
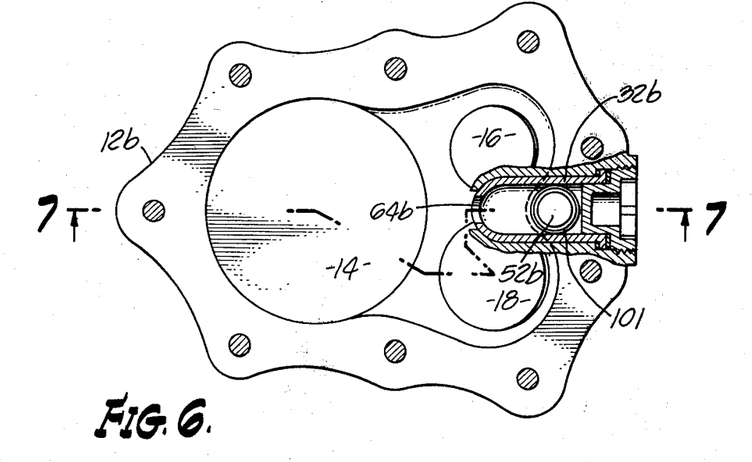
FIG. 6 shows another modification, partly in section, taken along lines 6—6 of FIG. 7.
Figures 7, 8:
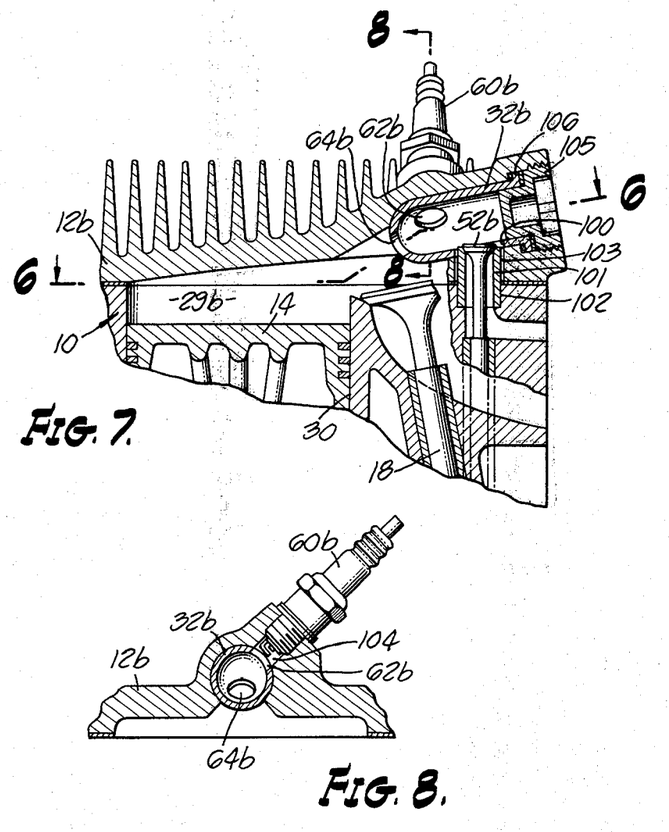
FIG. 7 is a sectional detail taken along lines 7—7 of FIG. 6.
FIG. 8 is a sectional detail taken along lines 8—8 of FIG. 7.

In the modified form of the invention shown in FIGS. 6, 7 and 8, the engine block 10, piston 14, cylinder 30, main intake valve 18, exhaust valve 16, and cam shaft 20 may be substantially the same as previously described. However, the engine head 12b is modified to receive an inclined thin wall liner 32b having a torch nozzle 64b in its lower hemispherical end. An aperture 100 is provide in the cylindrical side wall of the liner 32b to receive a portion of the prechamber intake valve 52b and its cooperating stationary seat member 101. The seat member 101 is tubular in shape and is fixed in a recess 102 provided in the engine block 10 and projects through a clearance opening 103 provided in the engine head 12b.

Another aperture 62b in the liner 32b communicates with a recess 104 containing the electrodes of the spark plug 60b. A threaded plug 105 clamps the end flange 106 of the liner 32b in position with respect to the engine head 12b. The three openings in the prechamber comprise the torch nozzle 64b and the apertures 62b and 100.

While the torch nozzle described in connection with the embodiments of the invention shown in FIGS. 1–3 and in FIGS. 4 and 5 comprise a slot in a cylindrical portion of the thin will liner, the torch nozzle 64b in that form of the invention shown in FIGS. 6, 7 and 8 is preferably circular and is formed by a drill, now shown. The axis of this drilled hole is directed downward toward a part of the main combustion chamber 29b which is swept by the piston 14, instead of extending substantially at right angles to the axis of the cylinder 30, and the flame jet diverges from this round drilled hole. The use of the circular nozzle 64b directed downwardly in this embodiment is facilitated by the placement of the prechamber. The prechamber extends toward the main portion of the main combustion chamber 29b above the main intake and exhaust valves 16 and 18 and is therefore closer to the piston 14 than in the embodiment shown in FIGS. 1 – 3. This advantageous placement of the liner 32b is made possible by the extension of the prechamber intake valve 52b above the block 10. This extension is accomplished by means of the extended seat member 101. The prechamber intake valve 52b can still be driven by the same cam as the main intake and main exhaust valves 16 and 18. Thus, the prechamber is moved closer to the main chamber without sacrificing the advantageous simplicity and low cost of the side valve engine.

Thus, a cleaner burning more efficient side valve, reciprocating, internal combustion engine is provided. While embodiments and applications of this invention have been shown and described, it would be apparent to those skilled in the art that many more modifications are possible without departing from the inventive concepts herein described. The invention, therefore, is not to be restricted except by the spirit of the appended claims.

We claim:

1. In an internal combustion piston engine having a engine block and an engine head secured thereto, the block having a piston reciprocable in a cylinder, the block, head and piston cooperating to define a main combustion chamber having a portion extending laterally from said cylinder, and intake and exhaust valves mounted in the block at one side of the cylinder and communicating with the laterally extending portion of the main combustion chamber, the improvement comprising, in combination: means in the head forming a prechamber provided with three openings, a prechamber intake valve mounted in the block and communicating with one of the openings, a spark plug mounted in the head and communicating with another of the openings, and the third opening comprising a torch nozzle establishing communication between the prechamber and the main combustion chamber.

2. The combination set forth in claim 1 wherein the prechamber is formed by a thin wall liner secured to the head.

3. The combination set forth in claim 1 wherein said prechamber inlet valve comprises a poppet type valve extending into an opening in a cylindrical portion of said means forming said prechamber.

4. The combination of claim 1 wherein said spark plug is positioned relative to said opening communicating with said prechamber intake valve and relative to said torch nozzle such that air-fuel mixture moving through said prechamber intake valve opening and said torch nozzle will not directly impinge on the electrodes of said spark plug.

5. In a side valve internal combustion engine having a piston reciprocating in a cylinder, the combination of: means forming a main combustion chamber extending laterally from said piston and cylinder, a prechamber positioned adjacent said main combustion chamber and remote from said piston and cylinder, means for providing a rich air-fuel mixture to said prechamber said means including a prechamber inlet manifold, said prechamber inlet manifold having a right angle bend along its path, and said engine further including an exhaust manifold, said exhaust manifold extending subjacent said prechamber intake manifold at said right angle bend, means for providing a lean air-fuel mixture to the main combustion chamber, means for igniting the mixture in said prechamber, and the prechamber having a wall provided with a torch slot for directing a diverging torch flame laterally into the main combustion chamber.

6. A side valve, reciprocating, internal combustion engine including an engine block and an engine head and having at least one main combustion chamber defined by a cylinder located within the engine block, the engine head and a piston located within the cylinder and having associated with the main combustion chamber an intake valve and an exhaust valve, the intake and exhaust valves being located in the block adjacent the corresponding cylinder and the main combustion chamber extending from above the intake and exhaust valves to the reciprocating piston, wherein the improvement comprises: a prechamber established adjacent the main combustion chamber and above the intake valve and exhaust valve, a prechamber intake valve extending upwardly from the block to said prechamber above the intake valve and exhaust valve, a spark plug in communication with said prechamber and a torch nozzle located through the wall of said prechamber opening toward the cylinder.

7. The engine of claim 6 wherein there is included an extended seat member, said extended seat member extending upwardly from the block to said prechamber to cooperate with said prechamber intake valve extending upwardly from said block.

8. The engine of claim 6 wherein the combination further includes a cam shaft, said cam shaft being positioned to actuate the intake and exhaust valves and said prechamber intake valve.

9. The engine of claim 6, wherein said spark plug is positioned relative to said prechamber intake valve and relative to said torch nozzle such that air-fuel mixture moving through said prechamber intake valve and said torch nozzle will not directly impinge on the electrodes of said spark plug.

10. In an internal combustion piston engine having an engine block and and an engine head secured thereto, the block having a piston reciprocable in a cylinder, the block, head and piston cooperating to define a main combustion chamber having a portion extending laterally from said cylinder, and intake and exhaust valves mounted in the block at one side of the cylinder and communicating with the laterally extending portion of the main combustion chamber, the improvement comprising, in combination: means in the head forming a prechamber provided with three openings, a prechamber intake valve mounted in the block and communicating with one of the openings, a spark plug mounted in the head and communicating with another of the openings, and the third opening comprising a torch nozzle establishing communication between the prechamber and the main combustion chamber, the torch nozzle comprising an elongated slot in a cylindrical portion of said means forming said prechamber.

11. In an internal combustion piston engine having an engine block and an engine head secured thereto, the block having a piston reciprocable in a cylinder, the block, head and piston cooperating to define a main combustion chamber having a portion extending laterally from said cylinder, and intake and exhaust valves mounted in the block at one side of the cylinder and communicating with the laterally extending portion of the main combustion chamber, the improvement comprising, in combination: means in the head forming a prechamber comprising an elongated thin walled liner extending toward the cylinder into the laterally extending portion of the main combustion chamber at a downward incline, and three openings through the thin walled liner, a prechamber intake valve mounted in the block and communicating with a first one of the openings, said first opening being through an upper portion of the inclinded, elongated, thin walled liner, a spark plug mounted in the head and communicating with a second one of the openings, and a third one of the openings comprising a torch nozzle located at the lower end of the inclined, elongated, thin walled liner to establish communication between the prechamber and the main combustion chamber, the lowest portion of the chamber forming a fuel trap.

12. In an internal combustion piston engine having an engine block and an engine head secured thereto, the block having a piston reciprocable in a cylinder, the block, head and piston cooperating to define a main combustion chamber having a portion extending laterally from said cylinder, intake and exhaust valves mounted in the block at one side of the cylinder and communicating with the laterally extending portion of the main combustion chamber, and a cam shaft positioned in said block to actuate the intake and exhaust valves, the improvement comprising, in combination: means in the head forming a prechamber provided with three openings, a prechamber intake valve mounted in the block and communicating with one of the openings, said prechamber intake valve being disposed immediately adjacent to said intake and exhaust valves and said cam shaft further being positioned to actuate said prechamber intake valve, a spark plug mounted in the head in communicating with another of the openings, and the third opening comprising a torch nozzle establishing communication between the prechamber and the main combustion chamber.

* * * * *

UNITED STATES PATENT OFFICE
CERTIFICATE OF CORRECTION

PATENT NO. : 3,967,595
DATED : July 6, 1976
INVENTOR(S) : SHIZUO YAGI et al

It is certified that error appears in the above-identified patent and that said Letters Patent are hereby corrected as shown below:

Column 3, line 29, change numeral "15" to read --25--.

Column 4, line 28, change "plub 60" to read --plug 60--.

Column 4, line 29, change "the concentric" to read --and concentric--.

Column 7, line 29, change "now shown" to read --not shown--.

Claim 5, line 30, at end of line after "prechamber" place a comma.

Claim 12, line 34, "communicating" should read --communication--.

Signed and Sealed this

Twenty-eighth Day of September 1976

[SEAL]

Attest:

RUTH C. MASON
*Attesting Officer*

C. MARSHALL DANN
*Commissioner of Patents and Trademarks*